United States Patent
Simon et al.

[11] Patent Number: 5,902,843
[45] Date of Patent: May 11, 1999

[54] HOT-MELT ADHESIVE COMPOSITION FOR THE COATING OF INTERLINING MATERIAL

[75] Inventors: Ulrich Simon, Herne; Siegfried Hahn, Hennef-Stossdorf, both of Germany

[73] Assignee: Huels Aktiengesellschaft, Marl, Germany

[21] Appl. No.: 08/621,009

[22] Filed: Mar. 22, 1996

[30] Foreign Application Priority Data

Mar. 22, 1995 [DE] Germany ............................ 195 10 316

[51] Int. Cl.⁶ ............................ C08L 63/02; C08L 67/02; C08L 77/02; C08K 5/10
[52] U.S. Cl. ........................ 523/453; 523/455; 524/169; 524/285; 525/423; 525/425; 525/934
[58] Field of Search ...................... 525/423, 425, 525/934; 524/169, 285; 523/453, 455

[56] References Cited

U.S. PATENT DOCUMENTS

| | | | |
|---|---|---|---|
| 4,055,534 | 10/1977 | Gerber | 525/437 |
| 4,217,435 | 8/1980 | McConnell et al. | 525/425 |
| 4,267,219 | 5/1981 | Ueno et al. | 428/327 |
| 4,844,959 | 7/1989 | Read et al. | 525/423 |
| 5,290,594 | 3/1994 | Groshens et al. | 427/244 |
| 5,439,737 | 8/1995 | Trabelsi | 525/423 |

*Primary Examiner*—Donald R. Wilson
*Attorney, Agent, or Firm*—Oblon, Spivak, McClelland, Maier & Neustadt, P.C.

[57] ABSTRACT

Conventional hot-melt adhesive compositions for the coating of textile sheet structures exhibit problems in respect of resistance to washing and cleaning. The presence of an epoxide in hot-melt adhesive composition enables the production of cleaning-resistant laminated materials having a particularly high level of wash resistance.

8 Claims, No Drawings

HOT-MELT ADHESIVE COMPOSITION FOR THE COATING OF INTERLINING MATERIAL

BACKGROUND OF THE INVENTION

1. Field of the Invention

The present invention relates to hot-melt adhesive compositions for the coating of sheet structures, for example textiles, leather, foam materials or polymer films. The present invention relates in particular to hot-melt adhesive compositions for the patternwise coating of bondable interlining materials for the clothing industry, especially for outer clothing.

2. Discussion of the Background

Hot-melt adhesive compositions are known which are preferably applied in a pattern, in the form of an aqueous paste, to a sheet structure to be coated. Drying and sintering are then carried out. The sintered product constitutes the hot-melt adhesive composition. The coated sheet structures are laminated, in sheet form or cut to shape, with other sheet structures in sheet form or cut to shape, under the action of pressure and a comparatively mild temperature to give cleaning-resistant laminates having a particularly high degree of wash resistance and adhesion.

Numerous hot-melt adhesive compositions having cleaning-resistant properties are known for use in screen-printing. These are principally formed from aqueous-pasty mixtures comprising fine hot-melt adhesive powders, which can also be employed per se, in coarser granular form, directly for coating by the scatter or powder dot method. The cleaning-resistant hot-melt adhesive compositions most in use today are based on copolyamides, copolyesters or low-pressure polyethylene. Other hot-melt adhesive compositions which are likewise used are not resistant to cleaning.

To form a paste from the fine hot-melt adhesive powders, in order to produce the adhesive layer, special suspension agents or dispersants are used which allow the pastes to be printed cleanly without reducing the resistance to cleaning. In addition, dispersants are intended to give rise to particular features in terms of properties, for example the prevention of sedimentation of the powders incorporated by mixing, a print with well-defined contours, controlled penetration of the hot-melt adhesive paste, prevention of penetration by the outer material, the avoidance of recoiling in the course of bonding, or the prevention of the edges becoming welded together while the sheet structures are being cut to shape. Examples of such dispersants have been described, for example, in U.S. Pat. Nos. 3,956,213, 4,237,040 and 4,272, 566. Plasticizers can be added to the dispersants. In many cases, further additives comprising high molecular weight polyethylene oxide are added, which increase the spreadability of the paste.

For coating in a pattern by the screen-printing technique, screen-printing stencils are used which have a regular or irregular arrangement of perforations through which hot-melt adhesive compositions are pressed onto the interlining material using an internal doctor blade. Whereas, formerly, screen stencils were used which had a comparatively wide spacing and large apertures, for example 17 mesh, in recent times coatings of increasing fineness have been carried out with a close sequence of smaller apertures, for example 30 mesh, with the formation of small, closely adjacent dots of hot-melt adhesive. Moreover, the interlining materials have become more lightweight, finer and more open. The problems associated with coating have grown as the patterns have become finer, and the cleaning and washing problems have increased at the same time, since the larger pattern arrangement with larger individual dots produced a greater adhesive strength than the finer pattern arrangement with relatively small individual dots.

However, the use of interlining materials has also experienced a gradual change. For reasons of fashion and, probably, of environmental protection as well, there is increasing use in articles of clothing of interlining materials which have been or are to be washed rather than cleaned, for example interlinings for leisure wear.

This change in trends has led to the gradual replacement of copolyamide hot-melt adhesives which were originally used exclusively for articles of outer clothing by copolyesters, since copolyesters—although not having the particularly good dry-cleaning resistance of the copolyamides—nevertheless possess a better resistance to washing. Low-pressure polyethylenes are excluded because of the excessive bonding temperatures.

Costs and quality issues have dictated a marked reduction in the quantity of coating which is applied per $m^2$ of interlining material. Whereas, formerly, add-ons of from 18 to 25 $g/m^2$ were common, they are nowadays from 7 to 15 $g/m^2$, to meet the need for a soft, flowing drape of the bonded articles of clothing.

In order to solve the problems relating to the reduced washing and cleaning resistance and to the weaker adhesion, improved hot-melt adhesive compositions and also improved coating technologies were developed. Dual-dot or double-dot coatings are described, for example, in patents DE-B 22 14 236, DE-B 22 31 723, DE-B 25 36 911, and DE-B 32 30 579. Moreover, patents EP-A 0 219 376 and EP-A 0 365 711, describe an indirect coating method.

The coating substrates were improved by using finer yarns having individual fibers of finer denier, ranging down to the microfiber region, and synthetic yarns, for example high-bulk acrylic yarns and crimped polyester yarns. Moreover, the fabrics originally used have been replaced by other sheet structures, for example by weave-knit products or by weave-knit bonded fibre webs and stitch-bonded webs, the latter materials representing a combination of bonded fibre webs with knitted fabrics.

Deficiencies which continue to exist are seen, in particular, in a stiffening and in a reduced crease-resistance of a bonded laminate of interlining and outer material, especially in the case of finely patterned coatings. A factor regarded as being particularly negative, however, is that, in fine-coated interlining materials on fine outer materials, for example blouse outer materials, and despite the use of polyesters, the wash resistance of the bonded laminate is no more than moderate and in many cases is even deficient. There therefore continues to be a considerable need for an interlining of low coating weight which can be applied by hot pressing at the mild fixing temperatures which are nowadays conventional and which imparts a soft bonded handle, can be washed without any problems and retains a high adhesive strength after the washing procedure.

In particular, there is a great need for such interlinings in women's outer wear. Here in particular, depending on fashions, outer materials which lend themselves very unreadily to bonding, such as silk, polyester viscose georgette and siliconized or fluorocarbonized outer materials, are processed. The current interlinings achieve very good primary adhesion, but after washing or cleaning complete detachment occurs. Even complex coating methods such as the traditional double dot and indirect coating techniques bring hardly any success in this context.

SUMMARY OF THE INVENTION

Accordingly, it is one object of the present invention to provide novel hot-melt adhesive compositions.

It is another object of the present invention to provide novel hot-melt adhesive compositions which, with a reduced coating amount, have a high adhesive strength and outstanding resistance to washing and cleaning.

It is another object of the present invention to provide novel hot-melt adhesive compositions suitable for application to nonwovens, charmeuse, and weaveknit fabrics, primarily to interlinings having weights of 15 to 40 $g/m^2$, preferably interlinings which have been pretreated with silicones or silicone plasticizers.

It is another object of the present invention to provide novel hot-melt adhesive compositions which are suitable for use in a variety of coating methods.

It is another object of the present invention to provide novel hot-melt adhesive compositions which are suitable for use in paste dot, melt, and powder dot coating methods and for areal coatings, for example films and spun-bonded webs.

It is another object of the present invention to provide novel interlining materials for clothing which are provided with a coating of such a hot-melt adhesive composition.

It is another object of the present invention to provide novel interlining materials for clothing which are provided with a patterned coating of such a hot-melt adhesive composition.

It is another object of the present invention to provide a novel method for assembling clothing which affords clothing having a good resistance to washing and cleaning.

These and other objects, which will become apparent during the following detailed description, have been achieved by the inventors' surprising discovery that hot-melt adhesive compositions comprising a thermoplastic hot-melt adhesive and an expoxide fulfill these requirements.

DETAILED DESCRIPTION OF THE PREFERRED EMBODIMENTS

Thus, in a first embodiment, the present invention provides novel hot-melt adhesive compositions. The present hot-melt adhesive composition can comprise a copolyester, a copolyamide or both components. Particularly suitable epoxides are those based on bisphenol A epoxide.

In paste dot coating, the present hot-melt adhesive composition is applied to the article to be coated, for example a 15 $g/m^2$ nonwoven interlining for an article of clothing, preferably in aqueous-pasty form, using a rotary screen-printing stencil with 30 mesh (30 dots per inch). The copolyester/epoxide or copolyamide/epoxide hot-melt adhesive powders can be stirred into the paste individually or as a ready-produced mixture. The paste may be prepared by mixing the solid components with a liquid, such as water.

After a conventional drying and sintering procedure, the pattern-coated sheet structures are bonded with other sheet structures under the action of pressure and temperature to form a laminate having a higher degree of resistance to washing and cleaning. Compared with a similar pattern coating without the epoxide component, applied in an equal or lesser amount to the difficult-to-bond outer materials described above, the degree of adhesion which can be achieved after washing is ten times higher, and therefore the necessary coating quantity can be reduced, in order to obtain a soft, more crease-resistant and less stiff handle and drape of the laminate. The dried and sintered hot-melt adhesive composition can be present in the range from 6 to 13 $g/m^2$, especially from 6 to 10 $g/m^2$, as compared with from 8 to 12 $g/m^2$ in the case of conventional coatings.

The copolyesters and copolyamides which can be used in the present hot-melt adhesive compositions are those conventionally used in hot-melt adhesives. They contain butanediol-1,4 as essential building blocks. Suitable copolyesters have a melting point (DSC) of 90 to 120° C., preferably 95 to 115° C., and a particle size not more than 80 $\mu$m, preferably 1 to 80 $\mu$m.

Suitable copolyamides have a melting point (DSC) of 90 to 120° C., preferably 95 to 115° C., and a particle size not more than 80 $\mu$m, preferably 1 to 80 $\mu$m. They contain lauryl lactam as essential building blocks.

The bisphenol A epoxides which can be employed in the hot-melt adhesive paste are powders having a particle size of not more than 80 $\mu$m, preferably 1 to 80 $\mu$m, which have melting points (Kofler) of from 65 to 110° C., preferably 95 to 100° C., and epoxide equivalents of from 450 to 6,000 g/equivalent, preferably from 2,400 to 4,000 g/equivalent.

The hot-melt adhesive composition, consisting of a mixture of copolyester and bisphenol A epoxide or copolyamide and bisphenol A epoxide can also be applied in a pattern, in accordance with the invention, using an intaglio application machine (powder dot) or by melt application (melt-print technique). In the intaglio printing method, the powder is transferred from a powder hopper into a gently heated engraving roll (25 to 50° C.) and onto an interlining which has been brought by means of heating rolls (200 to 260° C.) to a surface temperature of about 170° C., and is then initially sintered in an IR tunnel. The aim is to achieve add-on weights of from 10 to 15 $g/m^2$.

In the paste dot and powder dot coating of sheet structures, especially interlining materials, a hot-melt adhesive composition is employed which is based on a thermoplastic hot-melt adhesive and an epoxide. Thermoplastic hot-melt adhesives which can be employed are copolyesters, copolyamides or both components, as are conventionally employed for the manufacture of textile interlinings, including those described above.

A suitable epoxide is preferably bisphenol A epoxide. The epoxide preferably has a particle size of less than 80 $\mu$m, preferably 1 to 80 $\mu$m, a melting point in the range from 65 to 110° C., preferably 95 to 100° C., and an epoxide equivalent of between 450 and 6,000 g/equivalent, preferably 2,400 to 4,000 g/equivalent.

If copolyesters and copolyamides are employed together alongside the epoxide, then the weight ratios of copolyester, copolyamide and epoxide are in the range from 50 to 90 wt. % (copolyester), from 5 to 25 wt. % (copolyamide) and from 5 to 25% of epoxide, and the epoxide is preferably employed in quantities of from 10 to 15 wt. %, all wt. % values based on the total weight of copolyester, copolyamide and epoxide. If only a copolyester is used alongside the epoxide, then the weight ratios of copolyester to epoxide are between 95:5 and 75:25, preferably between 90:10 to 70:30. When copolyamide and epoxide are used, the weight ratios of copolyamide to epoxide are between 95:5 and 75:25, preferably between 90:10 to 70:30. The bisphenol A epoxide can be added in the form of a ready-produced copolyester/epoxide or copolyamide/epoxide mixture, or can be added to the paste on its own.

The hot-melt adhesive paste can also contain one or more plasticizers. Preference is given to solid plasticizers such as para-toluolsulfonamid (PTSA), ortho-para-toluolsulfonamide (O-PTSA) or dicyclohexyl phthalate in a particle size of between 1 and 80 μm. The holt-melt adhesive composition can have a plasticizer content of from 8 to 20% by weight, based on the total weight of the hot-melt adhesive powder. The hot-melt adhesive composition is preferably employed as an aqueous-pasty mixture comprising thermoplastic hot-melt adhesive, epoxide and solid plasticizers. The dry content of the hot-melt adhesive composition is between 30 and 50% by weight.

Other features of the invention will become apparent in the course of the following descriptions of exemplary embodiments which are given for illustration of the invention and are not intended to be limiting thereof.

EXAMPLES

The copolyamides or copolyesters present in the powder mixture are commercial products, for example VESTAMELT X 7352, VESTAMELT 730, VESTAMELT 4481 from Hüls AG. Critical for the application according to the invention is the presence of the epoxide.

The hot-melt adhesive paste for the coating is prepared as follows. The following constituents are mixed in the manner indicated.

| Base paste: | | |
|---|---|---|
| Water | 1,800 g | |
| Mirox HP | 40 g | Polyacrylic acid derivative dispersion |
| Intrasol 12/18/5 | 60 g | Fatty alcohol ethoxylate |
| Tegopren 5847 | 10 g | Polysiloxane ethoxylate |
| Unimoll 66 M | 80 g | Dicyclohexyl phthalate |
| PTSA | 30 g | Para-toluenesulfonamide |
| Epoxide | 70 g | |
| Copolyester | 450 g | |
| Copolyamide | 150 g | |
| Mirox OX | 100 g | |

Example 1

To prepare a first paste, the following copolyester (I) and the following copolyamide (II) are used:

| Copolyester (I) VESTAMELT 4481 | | |
|---|---|---|
| Particle size: | from | 0 to 80 μm |
| Melt index (180° C., 21.6 N): | | 12 g/10 min |
| Melting point, ring + ball: | | 125° C. |
| Melting point (DSC): | | 108° C. |
| Manufacturer: Hüls AG | | |
| Copolyamide (II) VESTAMELT 730-P1 | | |
| Particle size: | from | 0 to 80 μm |
| Melt index (180° C., 21.6 N): | | 90 g/10 min |
| Melting point, (Mettler): | | 108° C. |
| Melting point (DSC): | | 98° C. |
| $\eta_{rel}$: | | 1.3 |
| Manufacturer: Hüls AG | | |

As the bisphenol A epoxide according to the invention, a product is employed which has the following properties:

| Particle size: | from | 0 to 80 μm |
|---|---|---|
| Melting range: | from | 100 to 110° C. (Kofler) |
| Epoxide equivalent: | from | 2,400 to 4,000 g/equivalent. |

After stirring the 3 powders (epoxide, copolyester and copolyamide) into the aqueous dispersion, a printable hot-melt adhesive paste is obtained which is applied using a 30 mesh rotary stencil to a 16 g/m² nonwoven made from a polyamide polyester mixture, which has subsequently been siliconized, and is dried. The dry add-on weight should be between 10 and 11 g/m².

Example 2

Instead of a copolyamide/copolyester mixture, in this paste only a copolyamide (VESTAMELT 730-P1) and the epoxide according to the invention were used.

Comparison Example 1

The base for this paste is that of Example 1 without the addition of epoxide.

| Formulation: | |
|---|---|
| Water | 1,800 g |
| Mirox HP | 40 g |
| Intrasol 12/18/5 | 60 g |
| Tegopren 5847 | 10 g |
| Unimoll 66 M | 80 g |
| PTSA | 30 g |
| VESTAMELT X 4481 | 450 g |
| VESTAMELT 730-Pl | 150 g |
| Mirox OX | 100 g |

The comparison interlining was processed in accordance with Examples 1 and 2. Add-on weight about 10 g/m².

All three interlinings were bonded to two different outer materials

I. Silk

II. Polyester georgette on a continuous press.

| Pressing force | 3.5 N/cm² |
|---|---|
| Pressing time | 10 s |
| Pressing temperature | 125° C. (temperature at point of join) |

| Specimen from | Outer material | Primary adhesion After bonding | Adhesion After washing 1 × at 40° C. |
|---|---|---|---|
| Example 1 | silk | tears | tears |
| Example 1 | georgette | 3.81 N/5 cm | 4.75 N/5 cm |
| Example 2 | silk | 4.4 N/5 cm | 0.97 N/5 cm |
| Example 2 | georgette | 2.8 N/5 cm | 0.68 N/5 cm |
| Comparison Example 1 | silk | 2.3 N/5 cm | 0 (fell apart) |
| Comparison Example 2 | georgette | 2.0 N/5 cm | 0 (fell apart) |

The table shows that the application according to the invention, Examples 1 and 2, is far superior to the traditional application (comparison example without epoxide) both in terms of primary adhesion and after washing at 40° C.

Example 3, Relating to Powder Dot Coating

A commercial copolyester (VESTAMELT 4580-P816) from Hüls AG is dry-blended with 10% of the bisphenol A epoxide described in Examples 1 and 2 and the blend is applied using a powder dot installation to a Raschel interlining of 75 g/m². An engraving roll was employed with 28 mesh. Add-on weights of from 13 to 15 g/m² were obtained. Subsequently, this interlining was bonded in a continuous press to a polyester/cotton outer material, employing the following bonding parameters:

Bonding temperature 135° C. (temperature at point of join)
Bonding time 10 s
Bonding pressure 3.5N Comparison Example 2

As prior art, the copolyester VESTAMELT 4580-P816 was likewise employed, but without the epoxide component, for coating and bonding in the manner described above.

| VESTAMELT 4580 (copolyester) | |
| --- | --- |
| Particle Size: | from 80 to 160 μm |
| Melt index: | 27 g/10 min (160° C./2.16 N) |
| Melting Point: | 131° C. (Mettler) |
| m.p. DSC: | 116° C. |
| Viscosity number: | 85 cm³/g |

| | | Evaluation | | |
| --- | --- | --- | --- | --- |
| | | Adhesion in N/5 m | | |
| Specimen from | Outer material | After bonding | washing 3 × at 60° | 5 × DC | Add-on |
| Prior art (Comparison Example 2) | PES/COT | 8.0 | 4.0 | 5.5 | 18 g/cm² |
| Example 3 | PES/COT | 9.0 | 7.0 | 7.5 | 14 g/m² |

The evaluation shows that, despite a lower add-on weight, the interlinings according to the present invention with epoxide give markedly better resistance values after washing 3×60° C. and after 5× dry cleaning.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A hot-melt adhesive composition for the coating of sheet structures, comprising a thermoplastic hot-melt adhesive comprising a mixture of a copolyester containing butanediol-1,4 as essential building blocks, a copolyamide containing lauryl lactam as essential building blocks and bisphenol A epoxide, wherein said copolyester, copolyamide, and bisphenol A epoxide have a particle size of not more than 80 μm and are present in amounts of 50 to 90 wt. % of copolyester
   5 to 25 wt. % of copolyamide
   5 to 25 wt. % of bisphenol A epoxide,
   wherein said copolyester and copolyamide have a melting point of 90 to 120° C., and said epoxide has a melting point of 65 to 110° C. and an epoxide equivalent of between 450 and 6,000 g/equivalent.

2. The hot-melt adhesive composition of claim 1, wherein said epoxide component is present in an amount of from 10 to 15% by weight.

3. The hot-melt adhesive composition of claim 1, wherein said hot-melt adhesive composition comprises one or more solid plasticizer selected from the group consisting of para-toluenesulfonamide, O-PTSA, and dicyclohexyl phthalate, said plasticizer having a particle size of between 1 and 80 μm.

4. The hot-melt adhesive composition of claim 1, wherein said hot-melt adhesive composition is an aqueous-pasty mixture of thermoplastic hot-melt adhesive and solid plasticizer and the dry content of the hot-melt adhesive composition is from 30 to 50% by weight, based on the total weight of said composition.

5. The hot-melt adhesive composition of claim 1, wherein said epoxide has a melting point in the range from 95 to 110° C. and an epoxide equivalent of between 2,400 and 4,000 g/equivalent.

6. The hot-melt adhesive composition of claim 4, wherein said plasticizer content is from 8 to 20% by weight, based on the total weight of the hot-melt adhesive powder.

7. The hot-melt adhesive composition of claim 4, wherein said bisphenol A epoxide is added to the paste as a ready-made copolyester/epoxide or copolyamide/epoxide mixture or the epoxide is added to the paste on its own.

8. A hot-melt adhesive composition according to claim 4, wherein said plasticizer is para-toluenesulfonamide and dicyclohexylphthalate.

* * * * *